United States Patent
Sun et al.

(10) Patent No.: US 9,779,725 B2
(45) Date of Patent: *Oct. 3, 2017

(54) VOICE WAKEUP DETECTING DEVICE AND METHOD

(71) Applicant: MEDIATEK Inc., Hsin-Chu (TW)

(72) Inventors: Liang-Che Sun, Taipei (TW); Chia-Hsien Lu, New Taipei (TW); Yiou-Wen Cheng, Hsinchu (TW); Hsin-Ping Cheng, Jhubei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/872,207

(22) Filed: Oct. 1, 2015

(65) Prior Publication Data

US 2016/0171975 A1    Jun. 16, 2016

Related U.S. Application Data

(60) Provisional application No. 62/090,614, filed on Dec. 11, 2014, provisional application No. 62/117,109, filed on Feb. 17, 2015.

(51) Int. Cl.
*G10L 15/00* (2013.01)
*G10L 15/08* (2006.01)
(Continued)

(52) U.S. Cl.
CPC ............ *G10L 15/08* (2013.01); *G06F 1/3206* (2013.01); *G06F 1/3287* (2013.01);
(Continued)

(58) Field of Classification Search
USPC ................ 704/234, 246, 247, 251, 252, 275
See application file for complete search history.

(56) References Cited

U.S. PATENT DOCUMENTS 7,567,827 B2 *   7/2009   Kim ..................... H04M 1/6008
                                                            370/311
8,768,712 B1     7/2014   Sharifi
(Continued)

FOREIGN PATENT DOCUMENTS

| EP | 2772907 A1 | 9/2014 |
| WO | 03026158 A1 | 3/2003 |
| WO | 2012025784 A1 | 3/2012 |

OTHER PUBLICATIONS

EP Extended Search Report dated Apr. 14, 2016 in corresponding application (No. 15196351.9-1901).
(Continued)

*Primary Examiner* — Leonard Saint Cyr
(74) *Attorney, Agent, or Firm* — McClure, Qualey & Rodack, LLP

(57) ABSTRACT

A voice wakeup detecting device for an electronic product includes a front end detecting circuit, a speech recognition processor and a main processor. The front end detecting circuit judges whether a voice signal contains a sub-keyword according to sub-keyword model parameters. If the front end detecting circuit confirms that the voice signal contains the sub-keyword, then it generates a first interrupt signal. In response to the first interrupt signal, the speech recognition processor is enabled to judge whether the voice signal contains a keyword according to keyword model parameters. If the speech recognition processor confirms that the voice signal contains the keyword, then it generates a second interrupt signal. In response to the second interrupt signal, the main processor is enabled. Consequently, the electronic produce is waked up from a sleep state to a normal working state.

20 Claims, 6 Drawing Sheets

(51) Int. Cl.
*G06F 1/32* (2006.01)
*G10L 15/22* (2006.01)
*G10L 15/32* (2013.01)
*G06F 9/44* (2006.01)
*G10L 15/02* (2006.01)
*G10L 15/20* (2006.01)

(52) U.S. Cl.
CPC ............ *G06F 9/4418* (2013.01); *G10L 15/02* (2013.01); *G10L 15/20* (2013.01); *G10L 15/22* (2013.01); *G10L 15/32* (2013.01); *G10L 2015/088* (2013.01)

(56) References Cited

U.S. PATENT DOCUMENTS

| | | | |
|---|---|---|---|
| 2011/0288860 A1 | 11/2011 | Schevciw et al. | |
| 2014/0136215 A1* | 5/2014 | Dai | G10L 15/22 704/275 |
| 2014/0348345 A1* | 11/2014 | Furst | H04R 3/00 381/111 |
| 2015/0026580 A1* | 1/2015 | Kang | G06F 3/167 715/728 |
| 2015/0043755 A1* | 2/2015 | Furst | H04R 3/00 381/114 |
| 2015/0112690 A1 | 4/2015 | Guha et al. | |
| 2015/0154954 A1* | 6/2015 | Sharifi | G10L 15/08 704/251 |

OTHER PUBLICATIONS

Non-Final Office Action issued in U.S. Appl. No. 14/959,037, filed Dec. 4, 2015, mailed Sep. 8, 2016.

\* cited by examiner

VOICE WAKEUP DETECTING DEVICE AND METHOD

This application claims the benefit of U.S. provisional application Ser. No. 62/090,614, filed Dec. 11, 2014, and the benefit of U.S. provisional application Ser. No. 62/117,109, filed Feb. 17, 2015, the subject matters of which are incorporated herein by reference.

FIELD OF THE INVENTION

The invention relates to a detecting device and a control method thereof, and more particularly to a voice wakeup detecting device and a voice wakeup detecting method.

BACKGROUND OF THE INVENTION

Nowadays, the functions of smart phones are more diversified. For example, the smart phones with a voice wakeup function are favored by most consumers. For example, when the smart phone in a sleep state receives a voice of a keyword from the user, the smart phone starts to recognize the keyword. If the keyword is authenticated, the smart phone is switched from the sleep state to a normal working state. In other words, the user can wake up the smart phone or other electronic devices without the need of pressing any function key of the smart phone.

FIG. 1 is a schematic functional block diagram illustrating a voice wakeup detecting device of an electronic product according to the prior art. The voice wakeup detecting device 100 comprises a front end detecting circuit 110, a speech recognition processor 120 and a main processor 130. The front end detecting circuit 110 comprises a microphone 102 and an event detector 104. In a sleep state, the front end detecting circuit 110 is still powered, and the microphone 102 and the event detector 104 are operated. Generally, the process of waking up the electronic product comprises the following three detection phases.

The event detector 104 performs acoustic event detection. The microphone 102 generates a voice signal Sa to the event detector 104. The event detector 104 detects the amplitude, the signal-to-noise ratio (SNR) or the sub-band SNR of the voice signal Sa.

When the electronic product is in the sleep state and the voice wakeup detecting device 100 is in a first detection phase, the microphone 102 receives the ambient voice and converts the ambient voice into the voice signal Sa. The voice signal Sa is transmitted to the event detector 104. If the amplitude of the voice signal Sa is higher than a threshold value, the event detector 104 generates a first interrupt signal INT1 to the speech recognition processor 120.

Alternatively, the event detector 104 may detect the signal-to-noise ratio (SNR) or the sub-band SNR of the voice signal Sa. For example, if the SNR or the sub-band SNR of the voice signal Sa is higher than a threshold value, the event detector 104 generates the first interrupt signal INT1 to the speech recognition processor 120.

An example of the speech recognition processor 120 is a digital signal processor (DSP), which is also referred to a tiny processor. The speech recognition processor 120 performs a speech recognition on the voice signal Sa. If the first interrupt signal INT1 is not asserted, the speech recognition processor 120 is not powered and thus disabled. Meanwhile, the voice wakeup detecting device 100 is in the first detection phase. Whereas, if the first interrupt signal INT1 is asserted, the speech recognition processor 120 is enabled. Consequently, the detection phase of the voice wakeup detecting device 100 is changed from the first detection phase to a second detection phase so as to perform the speech recognition of recognizing the keyword of the voice signal Sa.

In the second detection phase, the speech recognition processor 120 judges whether the voice signal Sa is the voice of the keyword. If the speech recognition processor 120 confirms that the voice signal Sa is the voice of the keyword, the speech recognition processor 120 generates a second interrupt signal INT2 to the main processor 130. After the main processor 130 receives the second interrupt signal INT2, the detection phase of the voice wakeup detecting device 100 is changed from the second detection phase to a third detection phase.

Whereas, if the speech recognition processor 120 judges that the voice signal Sa is not the voice of the keyword, the speech recognition processor 120 does not generate the second interrupt signal INT2 to the main processor 130 and the speech recognition processor 120 is disabled again. Meanwhile, the detection phase of the voice wakeup detecting device 100 is changed from the second detection phase to the first detection phase. In the first detection phase, the front end detecting circuit 110 detects whether the first interrupt signal INT1 is asserted.

In the third detection phase, the main processor 130 is enabled and thus the smart phone is in the normal working state.

From the above discussions, the front end detecting circuit 110 of the smart phone in the first detection phase only judges the voice event of the voice signal Sa but does not recognize the keyword of the voice signal Sa. In the second detection phase, the speech recognition processor 120 starts to recognize the keyword of the voice signal Sa.

Since the front end detecting circuit 110 of the voice wakeup detecting device 100 is enabled only in the first detection phase, the power consumption is the lowest (e.g., about 1 mA). Since the front end detecting circuit 110 and the speech recognition processor 120 are both enabled in the second detection phase, the power consumption is increased (e.g., 6 mA).

However, the conventional voice wakeup detecting device 100 still has some drawbacks. For example, in case that the smart phone in the sleep state is placed in a noisy environment, the microphone 102 continuously receives the non-keyword voice. That is, the front end detecting circuit 110 may often assert the first interrupt signal INT1 due to noise triggering. Consequently, the detection phase of the conventional voice wakeup detecting device 100 is often switched between the first detection phase and the second detection phase. In other words, the use power consumption in a day is very huge.

SUMMARY OF THE INVENTION

The invention provides a voice wakeup detecting device and a voice wakeup detecting method for an electronic product. When the electronic product is in a sleep state, the voice wakeup detecting device can recognize the voice signal more accurately in the first detection phase. Consequently, the number of times that the voice wakeup detecting device performs the second detection phase is effectively reduced. In other words, the use power consumption in a day is reduced.

An embodiment of the invention provides a voice wakeup detecting device for an electronic product. The voice wakeup detecting device includes a front end detecting circuit for controlling a first interrupt signal by judging whether a voice signal contains a sub-keyword; a speech recognition processor, selectively enabled in response to the first interrupt signal, for controlling a second interrupt signal by judging whether the voice signal contains a keyword; and a main processor, selectively enabled in response to the second interrupt signal, so that the electronic product is waken up from a sleep state to a normal working state.

Another embodiment of the invention provides a voice wakeup detecting method for an electronic product. The voice wakeup detecting method includes the steps of providing a front end detecting circuit to receive a voice signal and recognize the voice signal; if the voice signal contains a voice of a sub-keyword, selectively enabling a speech recognition processor to recognize the voice signal; and if the voice signal contains a voice of a keyword, selectively enabling a main processor to wake up the electronic produce from a sleep state to a normal working state.

Numerous objects, features and advantages of the invention will be readily apparent upon a reading of the following detailed description of embodiments of the invention when taken in conjunction with the accompanying drawings. However, the drawings employed herein are for the purpose of descriptions and should not be regarded as limiting.

BRIEF DESCRIPTION OF THE DRAWINGS

The above objects and advantages of the invention will become more readily apparent to those ordinarily skilled in the art after reviewing the following detailed description and accompanying drawings, in which.

DETAILED DESCRIPTION OF PREFERRED EMBODIMENTS

The invention provides a speaker-dependent voice wakeup detecting device and a control method thereof. In accordance with the invention, a training action is performed to create sub-keyword model parameters and keyword model parameters. The sub-keyword model parameters and the keyword model parameters are applied to a first detection phase and a second detection phase, respectively.

Figure 1:
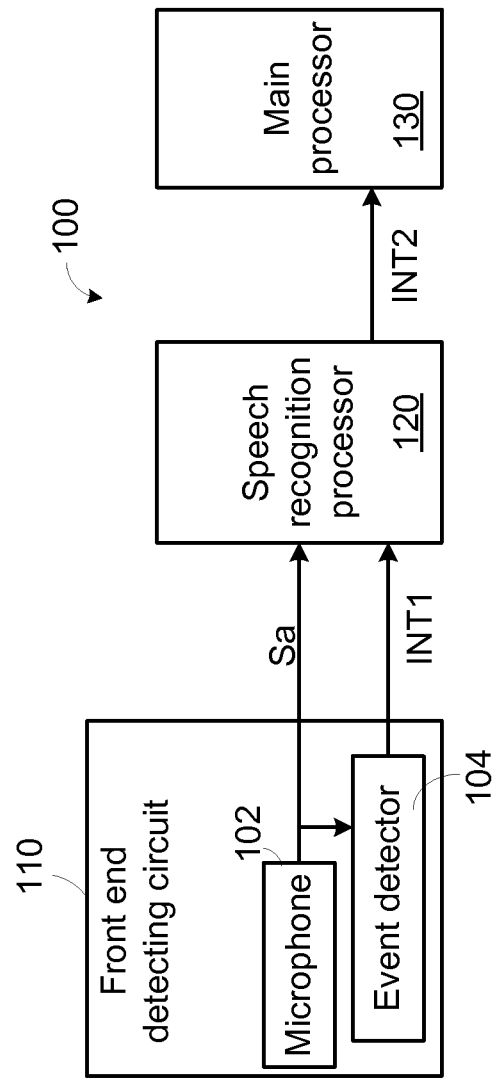
FIG. 1 (prior art) is a block diagram illustrating a voice wakeup detecting device of an electronic product according to the prior art.
Figure 2A:
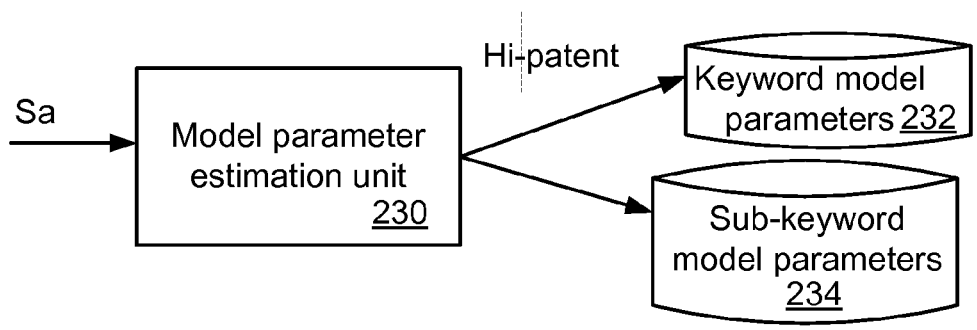
FIGS. 2A and 2B are block diagrams illustrating a voice wakeup detecting device of an electronic product in the normal working state and in the sleep state according to an embodiment of the invention.
Figure 2B:
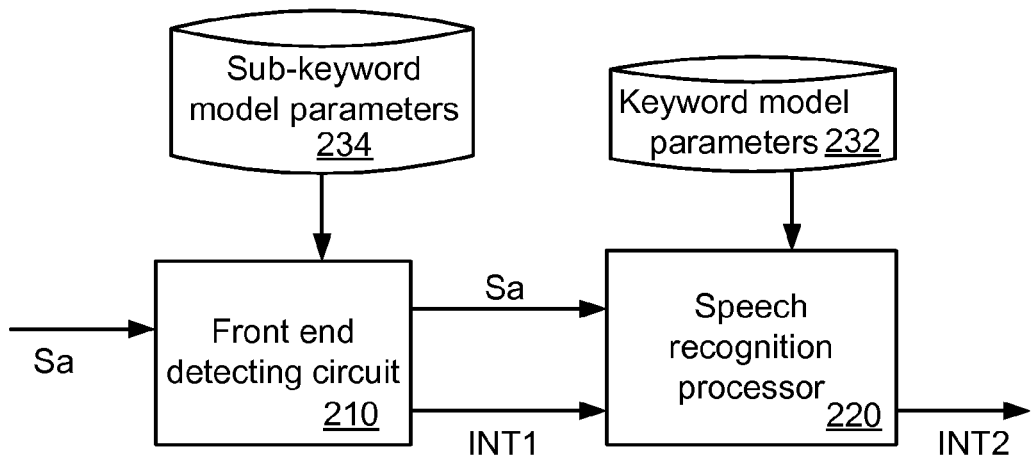

FIGS. 2A and 2B are block diagrams illustrating the implementation concept of a voice wakeup detecting device of an electronic product according to an embodiment of the invention. The voice wakeup detecting device comprises a front end detecting circuit 210, a speech recognition processor 220 and a main processor (not shown). When the electronic product is in a normal working state, the main processor can be used to generate keyword model parameters 232 and sub-keyword model parameters 234. When the electronic product is in a sleep state, the sub-keyword model parameters are applied to the first detection phase, and the keyword model parameters are applied to the second detection phase.

As shown in FIG. 2A, when the electronic product is in the normal working state, the main processor can be activated to perform the training action to receive a voice signal Sa of the keyword. The following embodiments will be illustrated by taking the keyword "Hi-Patent" and the sub-keyword "Hi" as examples.

During the process of performing the training action, a model parameter estimation unit 230 of the main processor firstly receives the voice signal Sa corresponding to the keyword "Hi-Patent" from the user, and then the model parameter estimation unit 230 performs a feature extracting action to extract voice features of the voice signal Sa. For example, the voice features includes frequency, sound volume, noise . . . etc. Then, the model parameter estimation unit 230 creates the keyword model parameters 232 of the voice signal Sa according to a specified speech recognition model. For example, the specified speech recognition model is a hidden Markov model (abbreviated HMM). It is noted that the example of the specified speech recognition model is not restricted. Another example of the specified speech recognition model includes but is not limited to a Gaussian mixture model (abbreviated GMM), a support vector machine (SVM) or a neural net model.

For creating the sub-keyword model parameters 234, the model parameter estimation unit 230 performs a segmenting operation on the keyword "Hi-Patent". The segmenting operation is based on the HMM of the keyword "Hi-Patent" by applying a Viterbi decoding algorithm to separate "Hi" and "Patent" of the keyword "Hi-Patent".

After the segmenting operation is completed, the model parameter estimation unit 230 acquires the sub-keyword "Hi" and thus creates the sub-keyword model parameters 234 according to HMM. It is noted that the segmenting operation is not restricted to separate the keyword "Hi-Patent" into "Hi" and "Patent". Alternatively, the keyword "Hi-Patent" is separated into "Hi-Pa," and "tent" after the segmenting operation is completed.

As shown in FIG. 2B, when the electronic product is in the sleep state and the voice wakeup detecting device is in the first detection phase, the front end detecting circuit 210 judges whether the voice signal Sa contains the voice of the sub-keyword "Hi" according to the sub-keyword model parameters 234. If the front end detecting circuit 210 confirms that the voice signal Sa contains the voice of the sub-keyword "Hi", the front end detecting circuit 210 generates a first interrupt signal INT1 to the speech recognition processor 220.

An example of the speech recognition processor 220 is a digital signal processor (DSP), which is also referred to a tiny processor. The speech recognition processor 220 performs speech recognition on the voice signal Sa. If the first interrupt signal INT1 is not asserted, the speech recognition processor 220 is not powered and thus disabled. Meanwhile, the voice wakeup detecting device is in the first detection phase. Whereas, if the first interrupt signal INT1 is asserted, the speech recognition processor 220 is enabled. Consequently, the detection phase of the voice wakeup detecting device is changed from the first detection phase to a second detection phase.

In the second detection phase, the speech recognition processor 220 judges whether the voice signal Sa is the voice of the keyword "Hi-Patent" according to the keyword model parameters 232. If the speech recognition processor 220 confirms that the voice signal Sa is the voice of the keyword "Hi-Patent", the speech recognition processor 220 asserts a second interrupt signal INT2 to the main processor. After the main processor receives the second interrupt signal INT2, the detection phase of the voice wakeup detecting device is changed from the second detection phase to a third detection phase.

Whereas, if the speech recognition processor 220 judges that the voice signal Sa is not the voice of the keyword "Hi-Patent", the speech recognition processor 220 does not assert the second interrupt signal INT2 to the main processor and the speech recognition processor 220 is disabled again. Meanwhile, the detection phase of the voice wakeup detecting device is changed from the second detection phase to the first detection phase. In the first detection phase, the front end detecting circuit 210 detects whether the first interrupt signal INT1 is generated.

From the above descriptions, the sub-keyword of the voice signal Sa is firstly recognized in the first detection phase. Consequently, the number of times that the voice wakeup detecting device performs the second detection phase is effectively reduced. In other words, the use power consumption in a day is reduced.

Figure 3:
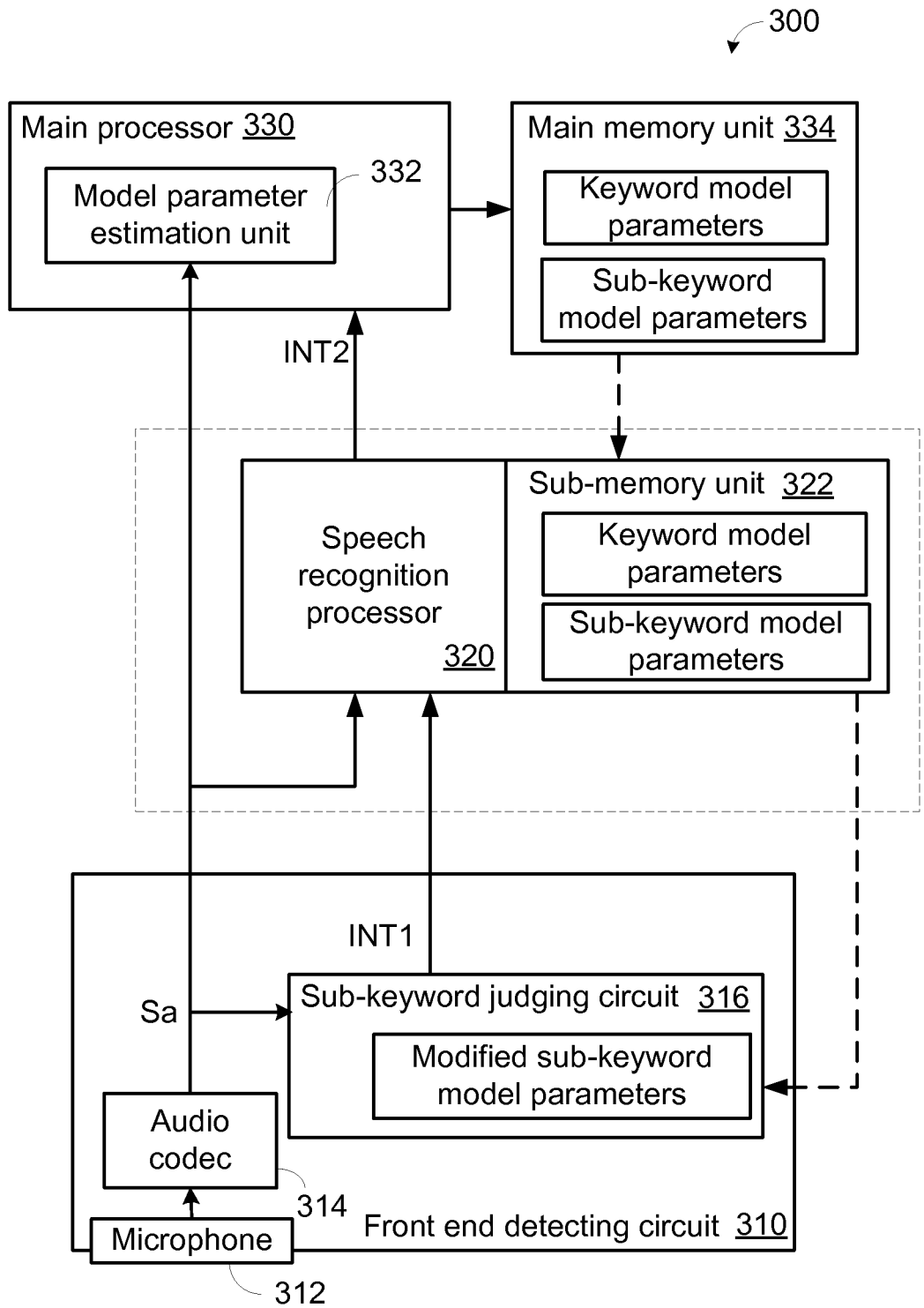
FIG. 3 is a block diagram illustrating a first exemplary voice wakeup detecting device of the electronic product according to the embodiment of the invention.

FIG. 3 is a schematic block diagram illustrating a first exemplary voice wakeup detecting device of the electronic product according to the embodiment of the invention. The voice wakeup detecting device 300 comprises a front end detecting circuit 310, a speech recognition processor 320 and a main processor 330. The front end detecting circuit 310 comprises a microphone 312, an audio codec 314 and a sub-keyword judging circuit 316. The microphone 312 generates an analog voice signal to the audio codec 314. By the audio codec 314, an analog voice signal from the microphone 312 is converted into a digital voice signal Sa.

The main processor 330 is connected with a main memory unit 334. The speech recognition processor 320 is connected with a sub-memory unit 322. The sub-keyword judging circuit 316 has an embedded memory (not shown). It is noted that the relationships between these components and the corresponding memory units are not restricted. For example, in another embodiment, the main memory unit 334 is an embedded memory of the main processor 330, the sub-memory unit 322 is an embedded memory of the speech recognition processor 320, and the sub-keyword judging circuit 316 is connected with an external memory unit.

When the electronic product is in a normal working state, the user may operate the main processor 330 to perform a training action. During the process of performing the training action, a model parameter estimation unit 332 of the main processor 330 firstly receives the voice signal Sa corresponding to the keyword "Hi-Patent" from the user, and then the model parameter estimation unit 332 creates keyword model parameters and sub-keyword model parameters of the voice signal Sa according to an HMM model. After the training action is completed, the keyword model parameters and the sub-keyword model parameters are stored into the main memory unit 334. For example, the main memory unit 334 is a non-volatile memory.

When the electronic product is about to be in a sleep state, the keyword model parameters and the sub-keyword model parameters are read out from the main memory unit 334 and stored into the sub-memory unit 322. Moreover, the speech recognition processor 320 may modify the sub-keyword model parameters according to the environmental factors. For example, the speech recognition processor 320 may acquire the signal-to-noise ratio (SNR), the noise type or other factors of the environment from the voice signal Sa. Consequently, the sub-keyword model parameters are modified into modified sub-keyword model parameters by the speech recognition processor 320. Then, the modified sub-keyword model parameters are transmitted to the sub-keyword judging circuit 316.

When the electronic product is in the sleep state, the front end detecting circuit 310 is powered. Consequently, the microphone 312, the audio codec 314 and the sub-keyword judging circuit 316 are enabled. In an embodiment, the process of waking up the electronic product from the sleep state comprises the following three detection phases.

In the sleep state, the front end detecting circuit 310 is in a first detection phase to judge whether the voice signal Sa contains the voice of the sub-keyword "Hi" according to the modified sub-keyword model parameters. If the front end detecting circuit 310 confirms that the voice signal Sa contains the voice of the sub-keyword "Hi", the front end detecting circuit 310 generates a first interrupt signal INT1 to the speech recognition processor 320.

That is, in the first detection phase, the sub-keyword judging circuit 316 judges whether the voice signal Sa contains the voice of the sub-keyword "Hi" according to the modified sub-keyword model parameters. If the sub-keyword judging circuit 316 confirms that the voice signal Sa contains the voice of the sub-keyword "Hi", the sub-keyword judging circuit 316 generates the first interrupt signal INT1 to the speech recognition processor 320. In response to the first interrupt signal INT1, the speech recognition processor 320 enters a second detection phase. Whereas, if the sub-keyword judging circuit 316 judges that the voice signal Sa does not contain the voice of the sub-keyword "Hi", the front end detecting circuit 310 is maintained in the first detection phase. An example of the speech recognition processor 320 is a digital signal processor (DSP), which is also referred to a tiny processor. The speech recognition processor 320 performs speech recognition on the voice signal Sa. If the first interrupt signal INT1 is not asserted, the speech recognition processor 320 is not powered and thus disabled. Meanwhile, the voice wakeup detecting device is in the first detection phase. Whereas, if the first interrupt signal INT1 is asserted, the speech recognition processor 320 is enabled. Consequently, the detection phase of the voice wakeup detecting device is changed from the first detection phase to the second detection phase.

In the second detection phase, the speech recognition processor 320 judges whether the voice signal Sa is the voice of the keyword "Hi-Patent" according to the keyword model parameters. If the speech recognition processor 320 confirms that the voice signal Sa is the voice of the keyword "Hi-Patent", the speech recognition processor 320 generates a second interrupt signal INT2 to the main processor 330. After the main processor 330 receives the second interrupt signal INT2, the detection phase of the voice wakeup detecting device is changed from the second detection phase to a third detection phase.

Whereas, if the speech recognition processor 320 judges that the voice signal Sa is not the voice of the keyword "Hi-Patent", the speech recognition processor 320 does not generate the second interrupt signal INT2 to the main processor 330 and the speech recognition processor 320 is disabled again. Meanwhile, the detection phase of the voice wakeup detecting device is changed from the second detection phase to the first detection phase. In the first detection phase, the front end detecting circuit 310 detects whether the first interrupt signal INT1 is generated.

In the third detection phase, the main processor 330 is enabled and thus the electronic product is in the normal working state.

Figure 4:
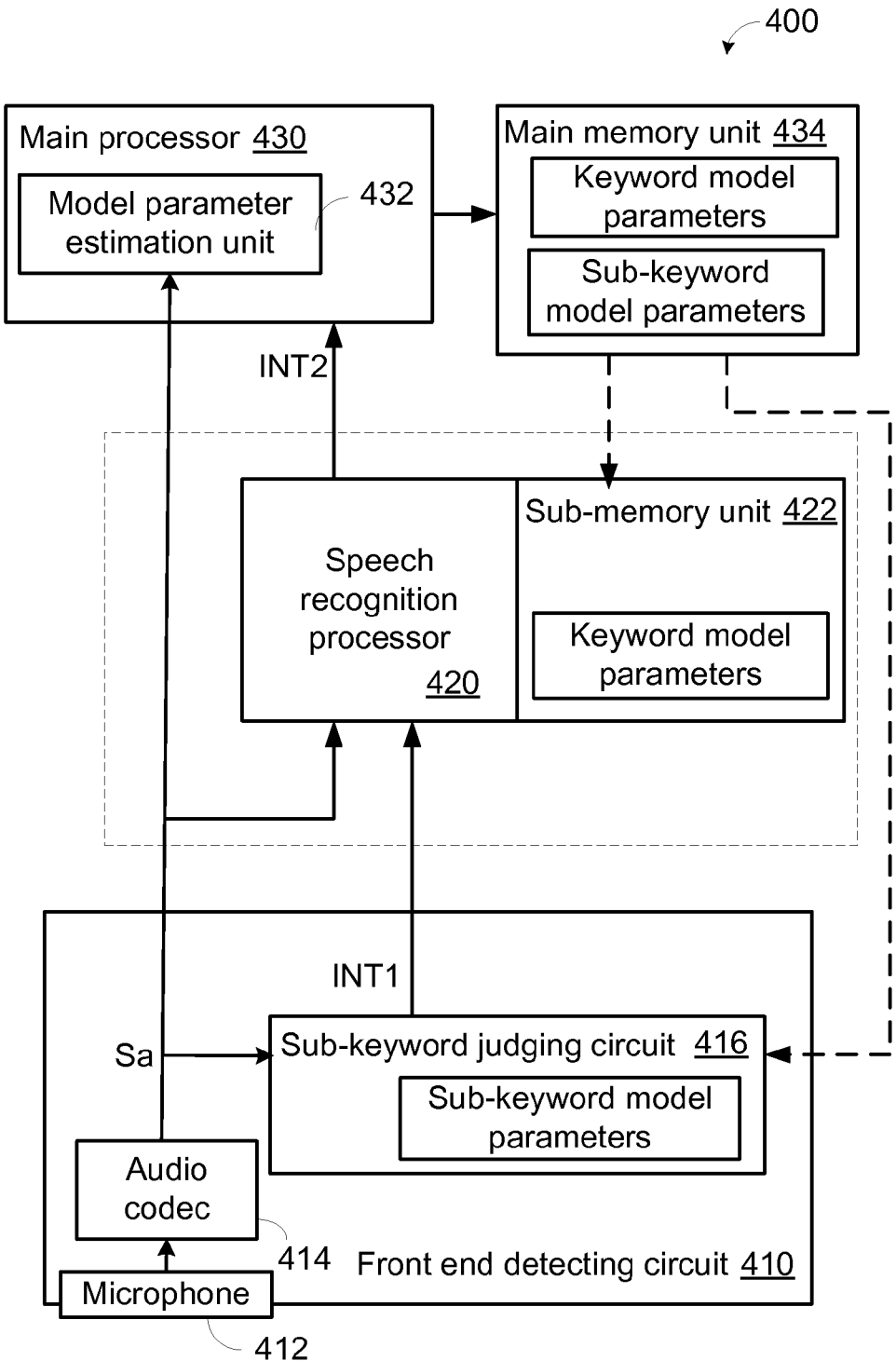
FIG. 4 is a block diagram illustrating a second exemplary voice wakeup detecting device of the electronic product according to the embodiment of the invention.

FIG. 4 is a schematic block diagram illustrating a second exemplary voice wakeup detecting device of the electronic product according to the embodiment of the invention. The voice wakeup detecting device 400 comprises a front end detecting circuit 410, a speech recognition processor 420 and a main processor 430. The front end detecting circuit 410 comprises a microphone 412, an audio codec 414 and a sub-keyword judging circuit 416.

The main processor 430 is connected with a main memory unit 434. The speech recognition processor 420 is connected with a sub-memory unit 422. The sub-keyword judging circuit 416 has an embedded memory (not shown).

In comparison with the first embodiment, the storing paths of the keyword model parameters and the sub-keyword model parameters are differentiated.

When the electronic product is about to be in a sleep state, the keyword model parameters and the sub-keyword model parameters are read out from the main memory unit 434, and the keyword model parameters and the sub-keyword model parameters are respectively stored into the sub-memory unit 422 and the embedded memory of the sub-keyword judging circuit 416.

In other words, the sub-keyword model parameters are directly transmitted from the main memory unit 434 to the embedded memory of the sub-keyword judging circuit 416 without being modified.

In an embodiment, the process of waking up the electronic product from the sleep state comprises the following three detection phases. In a first detection phase, the front end detecting circuit 410 judges whether the voice signal Sa contains the voice of the sub-keyword "Hi" according to the sub-keyword model parameters. If the front end detecting circuit 410 confirms that the voice signal Sa contains the voice of the sub-keyword "Hi", the front end detecting circuit 410 generates a first interrupt signal INT1 to the speech recognition processor 420. Whereas, if the front end detecting circuit 410 judges that the voice signal Sa does not contain the voice of the sub-keyword "Hi", the front end detecting circuit 410 does not generate the first interrupt signal INT1 to the speech recognition processor 420.

The second detection phase and the third detection phase of this embodiment are similar to those of the first embodiment, and are not redundantly described herein.

Figure 5A:
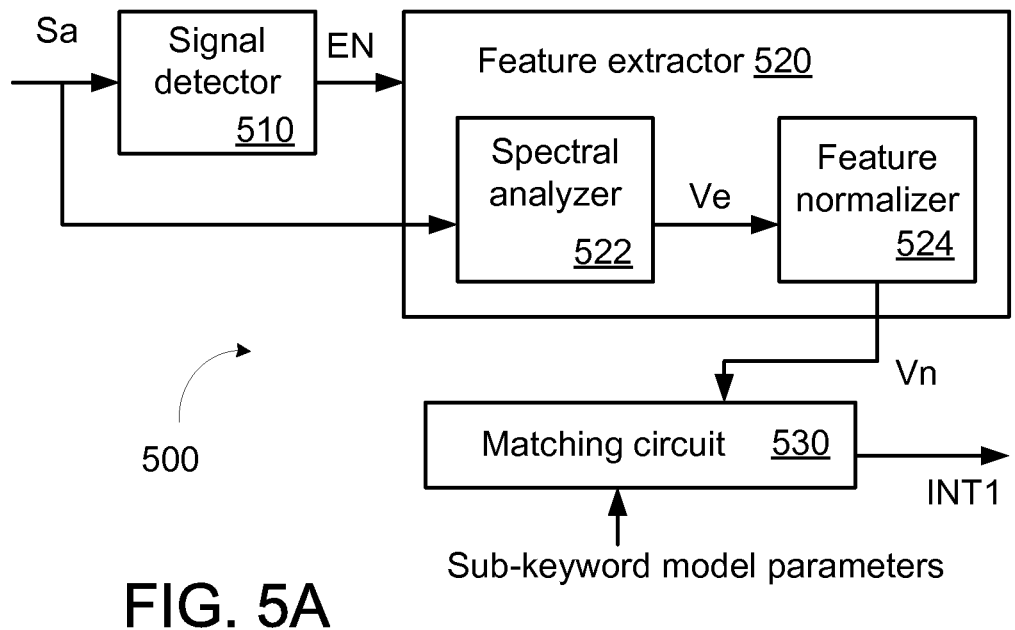
FIGS. 5A and 5B schematically illustrate the sub-keyword judging circuit of the voice wakeup detecting device according to the embodiment of the invention.
Figure 5B:
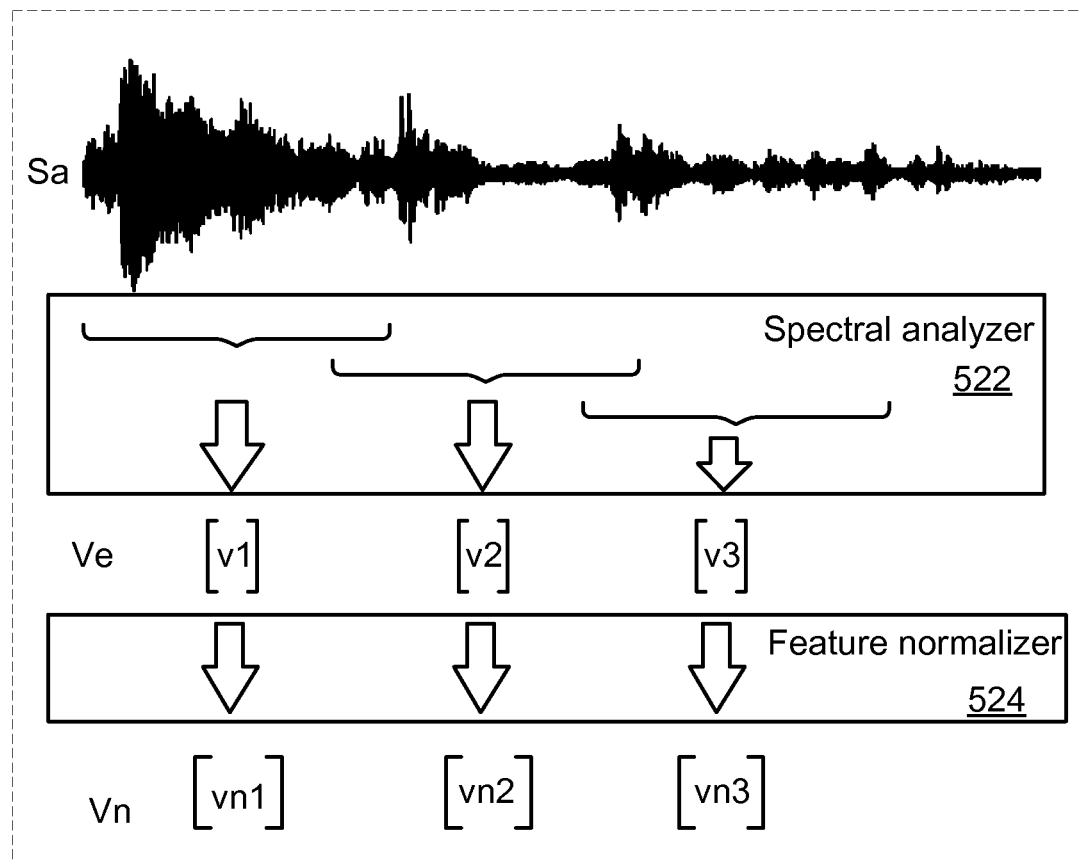

FIGS. 5A and 5B schematically illustrate the sub-keyword judging circuit of the voice wakeup detecting device according to the embodiment of the invention.

As shown in FIG. 5A, the sub-keyword judging circuit 500 comprises a signal detector 510, a feature extractor 520 and a matching circuit 530. The feature extractor 520 comprises a spectral analyzer 522 and a feature normalizer 524.

The signal detector 510 receives the voice signal Sa and detects the amplitude, the signal-to-noise ratio (SNR) or the sub-band SNR of the voice signal Sa. For example, if the amplitude of the voice signal Sa is higher than a threshold value, the signal detector 510 generates an enabling signal EN to enable the feature extractor 520.

After the feature extractor 520 is enabled, the spectral analyzer 522 extracts the information of the voice signal Sa and converts the information of the voice signal Sa into a voice feature signal Ve. The voice feature signal Ve denotes the voice feature of the voice signal Sa. Then, the feature normalizer 524 normalizes the voice feature signal Ve into a normalized voice feature signal Vn. The normalized voice feature signal Vn is transmitted to the matching circuit 530.

The matching circuit 530 judges whether the normalized voice feature signal Vn contains the voice of the sub-keyword "Hi" according to the sub-keyword model parameters, which have been previously stored in the memory. If the matching circuit 530 determines that the normalized voice feature signal Vn contains the voice of the sub-keyword "Hi", the matching circuit 530 generates the first interrupt signal INT1. Whereas, if the matching circuit 530 judges that the normalized voice feature signal Vn does not contain the voice of the sub-keyword "Hi", the matching circuit 530 does not generate the first interrupt signal INT1.

Generally, the matching circuit 530 judges whether the normalized voice feature signal Vn contains the voice of the sub-keyword "Hi" by a matching algorithm. For example, the matching algorithm is a dynamic matching algorithm or a Viterbi decoding algorithm, but is not limited thereto.

As shown in FIG. 5B, the spectral analyzer 522 employs a sub-band analysis technology to extract the information of the voice signal Sa and thus produces plural vectors v1, v2 and v3. These vectors v1, v2 and v3 constitute the voice feature signal Ve.

Then, the feature normalizer 524 normalizes the sound volume, the channel effect and the noise environment of the vectors v1, v2 and v3 into the normalized vectors vn1, vn2 and vn3. These vectors vn1, vn2 and vn3 constitute the normalized voice feature signal Vn.

The matching circuit 530 judges whether the normalized voice feature signal Vn contains the voice of the sub-keyword "Hi" by a matching algorithm utilizing the normalized voice feature signal Vn and the previously stored sub-keyword model parameters.

Figure 6:
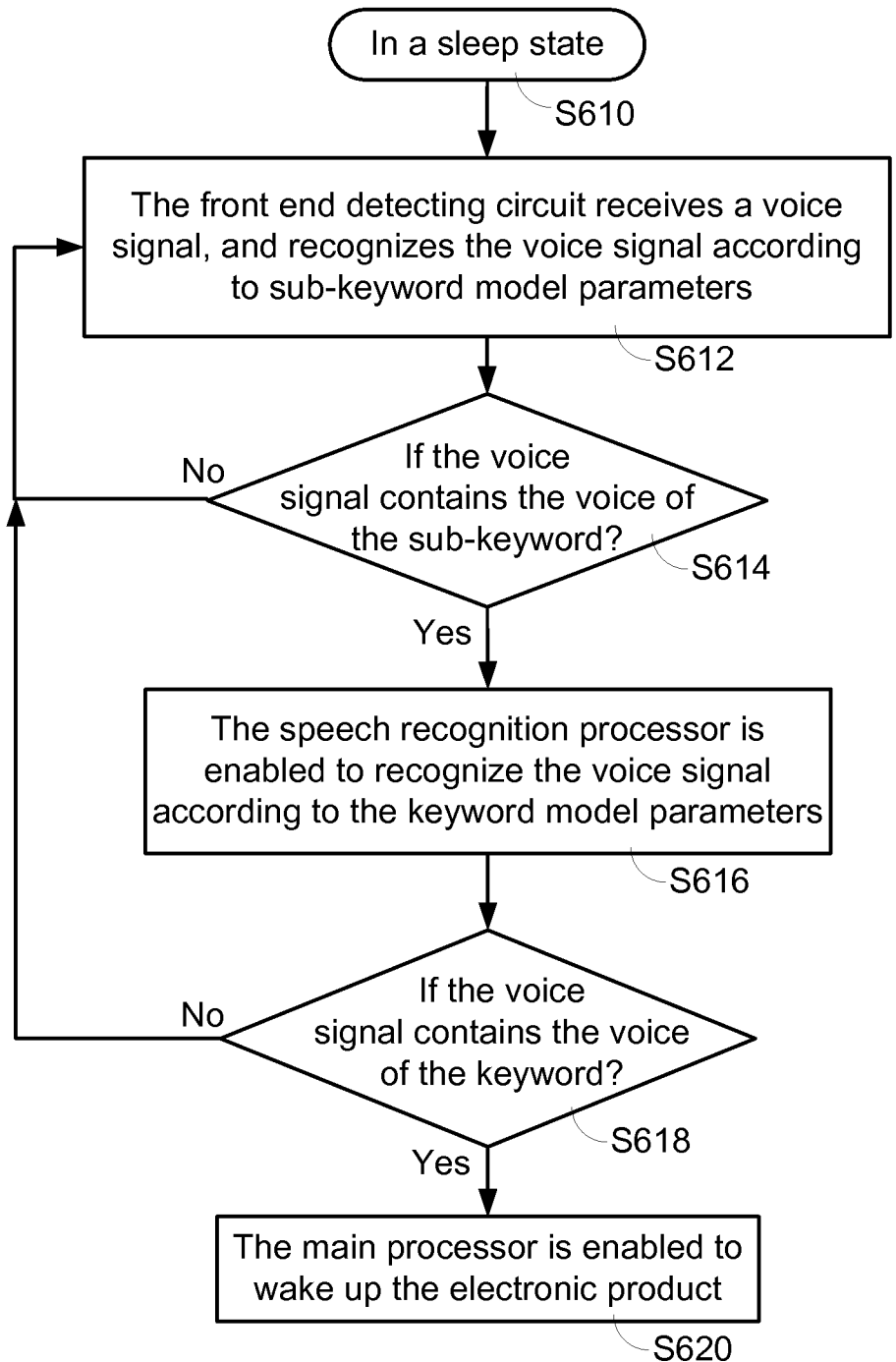
FIG. 6 is a flowchart illustrating a voice wakeup detecting method for an electronic device according to an embodiment of the invention.

FIG. 6 is a flowchart illustrating a voice wakeup detecting method for an electronic device according to an embodiment of the invention. When the electronic product is in a sleep state (Step S610), the voice wakeup detecting device is in a first detection phase. Meanwhile, the front end detecting circuit receives a voice signal, and recognizes the voice signal according to sub-keyword model parameters (Step S612). Then, the step S614 is performed to judge whether the voice signal contains the voice of the sub-keyword. If the voice signal does not contain the voice of the sub-keyword in the step S614, the step S612 is repeatedly done.

If the voice signal does contains the voice of the sub-keyword in the step S614, the voice wakeup detecting device is in a second detection phase. Meanwhile, the speech recognition processor is enabled to recognize the voice signal according to the keyword model parameters (Step S616). Then, a step S618 is performed to judge whether the voice signal contains the voice of the keyword. If the voice signal does not contain the voice of the keyword in the step S618, the step S612 is repeatedly done.

If the voice signal contains the voice of the keyword in the step S618, the voice wakeup detecting device is in a third detection phase. Meanwhile, the main processor is enabled to wake up the electronic product (Step S620). After the electronic product is waked up, the electronic product is in the normal working state.

In the above embodiments, the user may perform a training action to provide a voice of a keyword to the electronic product when the electronic product is in the normal working state. After the main processor receives the voice signal of the keyword from the user, keyword model parameters and sub-keyword model parameters are created.

Before the electronic product enters the sleep state, the keyword model parameters is stored into the sub-memory unit to be recognized by the speech recognition processor, and the sub-keyword model parameters (or the modified sub-keyword model parameters) are stored into the front end detecting circuit to be recognized by the sub-keyword judging circuit. Consequently, when the electronic product is in the sleep state, the voice wakeup detecting method of FIG. 6 is performed.

From the above descriptions, the invention provides a voice wakeup detecting device and a voice wakeup detecting method. In the first detection phase, the sub-keyword of the voice signal Sa is recognized. If the voice wakeup detecting device confirms that the voice signal Sa contains the voice of the sub-keyword, the voice wakeup detecting device is in the second detection phase. Consequently, the number of times that the voice wakeup detecting device performs the second detection phase is effectively reduced. In other words, the use power consumption in a day is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A voice wakeup detecting device for an electronic product, the voice wakeup detecting device comprising:
    a front end detecting circuit for controlling a first interrupt signal by judging whether a voice signal contains a sub-keyword, wherein if the front end detecting circuit confirms that the voice signal contains the sub-keyword, the front end detecting circuit asserts the first interrupt signal;
    a speech recognition processor, enabled in response to the first interrupt signal, for controlling a second interrupt signal by judging whether the voice signal contains a keyword, wherein if the speech recognition processor confirms that the voice signal contains the keyword, the speech recognition processor asserts the second interrupt signal; and
    a main processor, enabled in response to the second interrupt signal, so that the electronic product is waken up from a sleep state to a normal working state;
    wherein the speech recognition processor is not powered and disabled when the first interrupt signal is not asserted, and the speech recognition processor is disabled if the speech recognition processor confirms that the voice signal does not contain the keyword.

2. The voice wakeup detecting device as claimed in claim 1, wherein if the front end detecting circuit confirms that the voice signal contains the sub-keyword according to sub-keyword model parameters, the front end detecting circuit asserts the first interrupt signal.

3. The voice wakeup detecting device as claimed in claim 2, wherein if the speech recognition processor confirms that the voice signal contains the keyword according to keyword model parameters, the speech recognition processor asserts a second interrupt signal.

4. The voice wakeup detecting device as claimed in claim 3, wherein the front end detecting circuit comprises:
    a microphone for receiving a voice and converting the voice into an analog voice signal;
    an audio codec for converting the analog voice signal into a digital voice signal; and
    a sub-keyword judging circuit for judging whether the digital voice signal contains the sub-keyword according to the sub-keyword model parameters, wherein if the sub-keyword judging circuit confirms that the digital voice signal contains the sub-keyword, the sub-keyword judging circuit generates the first interrupt signal.

5. The voice wakeup detecting device as claimed in claim 4, wherein the sub-keyword judging circuit comprises:
    a signal detector for detecting an amplitude, a signal-to-noise ratio or a sub-band signal-to-noise ratio of the digital voice signal, thereby generating an enabling signal;
    a feature extractor, wherein in response to the enabling signal, the feature extractor is enabled to extract information of the digital voice signal and generate a normalized voice feature signal; and
    a matching circuit for judging whether the normalized voice feature signal contains the sub-keyword according to the sub-keyword model parameters, wherein if the matching circuit confirms that the normalized voice feature signal contains the sub-keyword, the matching circuit generates the first interrupt signal.

6. The voice wakeup detecting device as claimed in claim 5, wherein if the amplitude of the digital voice signal is higher than a first threshold value, or if the signal-to-noise ratio of the digital voice signal is higher than a second threshold value, or if the sub-band signal-to-noise ratio of the digital voice signal is higher than a third threshold value, the signal detector generates the enabling signal.

7. The voice wakeup detecting device as claimed in claim 5, wherein the feature extractor comprises:
    a spectral analyzer for extracting the information of the digital voice signal and generating plural vectors, wherein the plural vectors constitutes a voice feature signal; and
    a feature normalizer for normalizing the vectors of the voice feature signal, thereby generating the normalized voice feature signal.

8. The voice wakeup detecting device as claimed in claim 3, wherein the voice wakeup detecting device further comprises a main memory unit, and the main memory unit is connected with the main processor, wherein when the electronic product is in the normal working state and the main processor performs a training action, a model parameter estimation unit of the main processor receives the voice signal corresponding to the keyword from a user and creates the keyword model parameters and the sub-keyword model parameters, wherein the keyword model parameters and the sub-keyword model parameters are further stored into the main memory unit.

9. The voice wakeup detecting device as claimed in claim 8, wherein the voice wakeup detecting device further comprises a sub-memory unit, and the sub-main memory unit is connected with the speech recognition processor for storing the keyword model parameters and the sub-keyword model parameters, wherein the sub-keyword model parameters are modified into modified sub-keyword model parameters by the speech recognition processor, and the modified sub-keyword model parameters are transmitted to the front end detecting circuit.

10. The voice wakeup detecting device as claimed in claim 8, wherein the voice wakeup detecting device further comprises a sub-memory unit, the sub-main memory unit is connected with the speech recognition processor, and the front end detecting circuit comprises an embedded memory, wherein the sub-keyword model parameters are stored into the sub-memory unit, and the keyword model parameters are stored in the embedded memory.

11. A voice wakeup detecting method for an electronic product, the voice wakeup detecting method comprising steps of:
providing a front end detecting circuit to receive a voice signal and recognize the voice signal;
if the voice signal contains a voice of a sub-keyword, asserting a first interrupt signal to enable a speech recognition processor to recognize the voice signal, wherein the speech recognition processor is not powered and disabled when the first interrupt signal is not asserted;
if the voice signal contains a voice of a keyword, asserting a second interrupt signal to enable enabling a main processor to wake up the electronic product from a sleep state to a normal working state; and
if the voice signal does not contain the voice of the keyword, the speech recognition processor is disabled.

12. The voice wakeup detecting method as claimed in claim 11, wherein if the voice signal contains a voice of a sub-keyword according to sub-keyword model parameters, enabling the speech recognition processor to recognize the voice signal.

13. The voice wakeup detecting method as claimed in claim 12, wherein if the voice signal contains a voice of a keyword according to keyword model parameters, enabling the main processor to wake up the electronic product from the sleep state to the normal working state.

14. The voice wakeup detecting method as claimed in claim 13, wherein if the voice signal contains the voice of the sub-keyword, the front end detecting circuit generates a first interrupt signal to the speech recognition processor, wherein the speech recognition processor is enabled in response to the first interrupt signal.

15. The voice wakeup detecting method as claimed in claim 14, wherein if the voice signal contains the voice of the keyword, the speech recognition processor generates a second interrupt signal to the main processor, wherein the main processor is enabled in response to the second interrupt signal.

16. The voice wakeup detecting method as claimed in claim 13, wherein after the front end detecting circuit receives the voice signal, the front end detecting circuit performs steps of:
detecting an amplitude, a signal-to-noise ratio or a sub-band signal-to-noise ratio of the voice signal, thereby generating an enabling signal;
extracting information of the voice signal and generating a normalized voice feature signal in response to the enabling signal; and
judging whether the normalized voice feature signal contains the sub-keyword according to the sub-keyword model parameters.

17. The voice wakeup detecting method as claimed in claim 16, wherein if the amplitude of the voice signal is higher than a first threshold value, or if the signal-to-noise ratio of the voice signal is higher than a second threshold value, or if the sub-band signal-to-noise ratio of the voice signal is higher than a third threshold value, the signal detector generates the enabling signal.

18. The voice wakeup detecting method as claimed in claim 16, further comprising steps of:
extracting the information of the voice signal and generating plural vectors, wherein the plural vectors constitutes a voice feature signal; and
normalizing the vectors of the voice feature signal, thereby generating the normalized voice feature signal.

19. The voice wakeup detecting method as claimed in claim 13, wherein when the electronic product is in the normal working state and a model parameter estimation unit of the main processor receives the voice signal corresponding to the keyword from a user, the model parameter estimation unit creates the keyword model parameters and the sub-keyword model parameters.

20. The voice wakeup detecting method as claimed in claim 13, wherein the sub-keyword model parameters are modified sub-keyword model parameters.

* * * * *